(12) United States Patent
Luna et al.

(10) Patent No.: US 8,774,281 B2
(45) Date of Patent: Jul. 8, 2014

(54) IMPLEMENTATION OF A DV VIDEO DECODER WITH A VLIW PROCESSOR AND A VARIABLE LENGTH DECODING UNIT

(71) Applicants: Sony Corporation, Tokyo (JP); Sony Electronics Inc., Park Ridge, NJ (US)

(72) Inventors: Amelia C. Luna, San Jose, CA (US); Naxin Jason Wang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/623,395

(22) Filed: Sep. 20, 2012

(65) Prior Publication Data
US 2013/0077695 A1 Mar. 28, 2013

Related U.S. Application Data

(63) Continuation of application No. 11/594,462, filed on Nov. 7, 2006, now Pat. No. 8,437,404, which is a continuation of application No. 09/707,521, filed on Nov. 6, 2000, now Pat. No. 7,151,800.

(60) Provisional application No. 60/176,256, filed on Jan. 15, 2000.

(51) Int. Cl.
  *H04N 11/02* (2006.01)
  *H04N 7/26* (2006.01)
(52) U.S. Cl.
  CPC ................ *H04N 7/26106* (2013.01)
  USPC ........................................... 375/240.23
(58) Field of Classification Search
  USPC ................... 382/233–250; 375/240; 386/328
  See application file for complete search history.

(56) References Cited

U.S. PATENT DOCUMENTS

| 5,596,369 A | * | 1/1997 | Chau ........................ 375/240.15 |
| 5,721,822 A | * | 2/1998 | Agarwal ........................ 710/68 |
| 5,878,267 A | * | 3/1999 | Hampapuram et al. ........ 712/24 |
| 6,711,181 B1 | * | 3/2004 | Xue et al. ...................... 370/504 |
| 8,126,050 B2 | * | 2/2012 | Boyce et al. ............. 375/240.02 |

* cited by examiner

*Primary Examiner* — William C Vaughn, Jr.
*Assistant Examiner* — Luis M Perez
(74) *Attorney, Agent, or Firm* — John L. Rogitz (57) ABSTRACT

A decoder for decoding a plurality of digital video data is described. In an embodiment, the decoder comprises a DV video decoder for decoding digital video data which is formatted according to the DV standard. The DV video decoder has a Very-Long Instruction Word (VLIW) processor and a variable length decoding unit. The VLIW processor includes a preparser unit for recovering a decoding order of the digital video data so that the variable length decoding unit can process the digital video data. The variable length decoding unit decodes a variable length coding format of the digital video data which has been preparsed by the VLIW processor. Furthermore, the VLIW processor includes a decompression unit for decompressing the digital video data which has been decoded by the variable length decoding unit. In an embodiment, the VLIW processor and the variable length decoding unit are formed on the same semiconductor device.

20 Claims, 6 Drawing Sheets

IMPLEMENTATION OF A DV VIDEO DECODER WITH A VLIW PROCESSOR AND A VARIABLE LENGTH DECODING UNIT

RELATED U.S. APPLICATION

This application is a continuation application of U.S. Ser. No. 11/594,462 filed on Nov. 7, 2012 from which priority is claimed.

This patent application claims the benefit of U.S. application Ser. No. 09/707,521, filed on Nov. 6, 2000, entitled "IMPLEMENTATION OF A DV VIDEO DECODER WITH A VLIW PROCESSOR AND A VARIABLE LENGTH DECODING UNIT", by Amelia C. Luna, and Jason (Naxin) Wang, which claims the benefit of U.S. Provisional Application No. 60/176,256, filed on Jan. 15, 2000, entitled "PRE-PARSING OF VARIABLE LENGTH DIGITAL VIDEO (DV) STREAMS", by Amelia C. Luna, and Jason (Naxin) Wang, which are incorporated herein by reference.

BACKGROUND OF THE INVENTION

1. Field of the Invention

The present invention generally relates to the field of digital video data processing. More particularly, the present invention relates to the field of decoders for decoding digital video data.

2. Related Art

The advent of fast and powerful electronic circuits has enabled the development of digital video systems (e.g., digital cameras, digital VCR's, etc.). These digital video systems offer high resolution and high quality recorded images, surpassing the resolution and quality provided by analog video systems (e.g., analog cameras, analog VCR's, etc.). Moreover, the digital video systems include digital video data as well as digital audio data, raising the entertainment experience of the user. Since digital video systems manipulate digital data, the original recorded images stored in the digital format of digital video systems do not suffer the deterioration in quality observed with the original recorded images stored in the analog format of analog video systems.

Some digital video systems have been integrated into a computer system, allowing a user to edit and to view digital video data and digital audio data. Other digital video systems have been designed to communicate and to transfer digital data (e.g., digital video data and digital audio data) to a computer system, permitting the user to exchange or to view the digital data.

A popular digital video system stores digital video data which is formatted as specified in a specification entitled, "The Specification of Consumer Use Digital VCR's using 6.3 mm Magnetic Tape", (HD Video Conference, December, 1994). This specification is commonly known as the DV standard. The DV standard is a compressed digital video data and digital audio data recording standard. A DV digital video system uses a ¼ inch (6.35 mm) metal evaporate tape to record very high quality digital video data. Alternatively, a DV digital video system can record by transmitting to a memory device (e.g., hard drive, RAM, ROM, etc.) very high quality digital video data and digital audio data for storing therein. Both consumers and professionals use DV digital video systems.

To play the digital video data which is formatted according to the DV standard, the DV digital video system includes a DV video decoder for processing the digital video data into a format which can be displayed on an electronic display device. Since the DV video decoder processes the digital video data in real-time, speed and performance are crucial characteristics of the DV decoder. Generally, speed and performance are achieved at great cost. Hardware and software specifically designed for the DV video decoder can price the DV digital video system out of reach of the average consumer. Typically, off-the-shelve hardware and software adapted for the DV video decoder does not provide the speed and performance necessary for a DV digital video system. Some equipment manufactures have designed general-purpose components to provide a software solution for manufacturing low cost consumer digital video decoders.

SUMMARY OF THE INVENTION

A decoder for decoding a plurality of digital video data is described. In an embodiment, the decoder comprises a DV video decoder for decoding digital video data which is formatted according to the DV standard. The DV video decoder has a Very-Long Instruction Word (VLIW) processor and a variable length decoding unit. The VLIW processor includes a preparser unit for recovering a decoding order of the digital video data so that the variable length decoding unit can process the digital video data. The variable length decoding unit decodes a variable length coding format of the digital video data which has been preparsed by the VLIW processor. Furthermore, the VLIW processor includes a decompression unit for decompressing the digital video data which has been decoded by the variable length decoding unit. In an embodiment, the VLIW processor and the variable length decoding unit are formed on the same semiconductor device.

The decoder of the present invention primarily utilizes software to process the digital video data. Because the decoder is implemented in software, the decoder can be adapted to process different types of data formats simply by modifying the software rather than designing a new decoder.

The digital video data has an arrangement specified by the DV standard. In this arrangement, the digital video data is grouped into a plurality of Discrete Cosine Transform (DCT) blocks of fixed length representing compressed and variable length coded digital video data for a fixed number of pixels. During the DV recording process, the fixed number of pixels may generate more digital video data than can be stored within the fixed length of a particular DCT block. Since each DCT block has a fixed length, some of the digital video data belonging to the particular DCT block is distributed to one or more additional DCT blocks having unused space within their fixed lengths.

The VLIW processor preparses the digital video data so that the digital video data is re-associated with the corresponding DCT block. After the VLIW processor has prepared the digital video data, the digital video data is contiguous within the corresponding DCT block. Thus, the DCT blocks are transformed from fixed length to variable length to accommodate all the digital video data belonging to each DCT block. In addition, the re-ordering of the digital video data within the DCT block structure enables the variable length decoding unit to decode a variable length coding format of the digital video data. According to the present invention, the logically complicated process of preparsing the digital video data is executed by the VLIW processor while the variable length decoding unit focuses on decoding variable length symbols of the digital video data. Since the variable length decoding unit is designed to perform variable length decoding, the variable length decoding unit usually does not have enough processing logic (e.g., circuitry or software code) to collect the extra bits of a particular DCT block that are stored in other DCT blocks' unused space.

Moreover, a first plurality of digital video data can be preparsed by the VLIW processor while the variable length decoder unit decodes a second plurality of digital video data which has been preparsed. Additionally, the second plurality of digital video data which has been preparsed can be decoded by the variable length decoder unit while the VLIW processor decompresses a third plurality of digital video data which has been decoded. Since the DV decoder of the present invention concurrently executes multiple operations on the digital video data, the DV decoder of the present invention features superior speed and performance characteristics while containing costs.

These and other advantages of the present invention will no doubt become apparent to those of ordinary skill in the art after having read the following detailed description of the preferred embodiments which are illustrated in the drawing figures.

In one embodiment, the present invention includes a method of processing digital video data for displaying, the method comprising the steps of: a) preparsing the digital video data to recover a decoding order of the digital video data; b) decoding a variable length coding format of the digital video data; c) moving the digital video data that has been processed by the step b); and d) decompressing the digital video data to facilitate displaying the digital video data on an electronic display device.

In another embodiment, the present invention includes an apparatus for processing digital video data for displaying, the apparatus comprising: a processor configured to preparse the digital video data to recover a decoding order of the digital video data; and a variable length decoding unit coupled to the processor, wherein the variable length decoding unit is configured to decode a variable length coding format of the digital video data.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "preparsing", "decoding", "decompressing", "de-shuffling" or the like, refer to the actions and processes of an electronic system or a computer system. The computer system or similar electronic computing device manipulates and transforms data represented as physical (electronic) quantities within the computer system's registers and memories into other data similarly represented as physical quantities within the computer system memories or registers or other information storage, transmission, or display devices.

DV Video Decoder

Figure 1A:
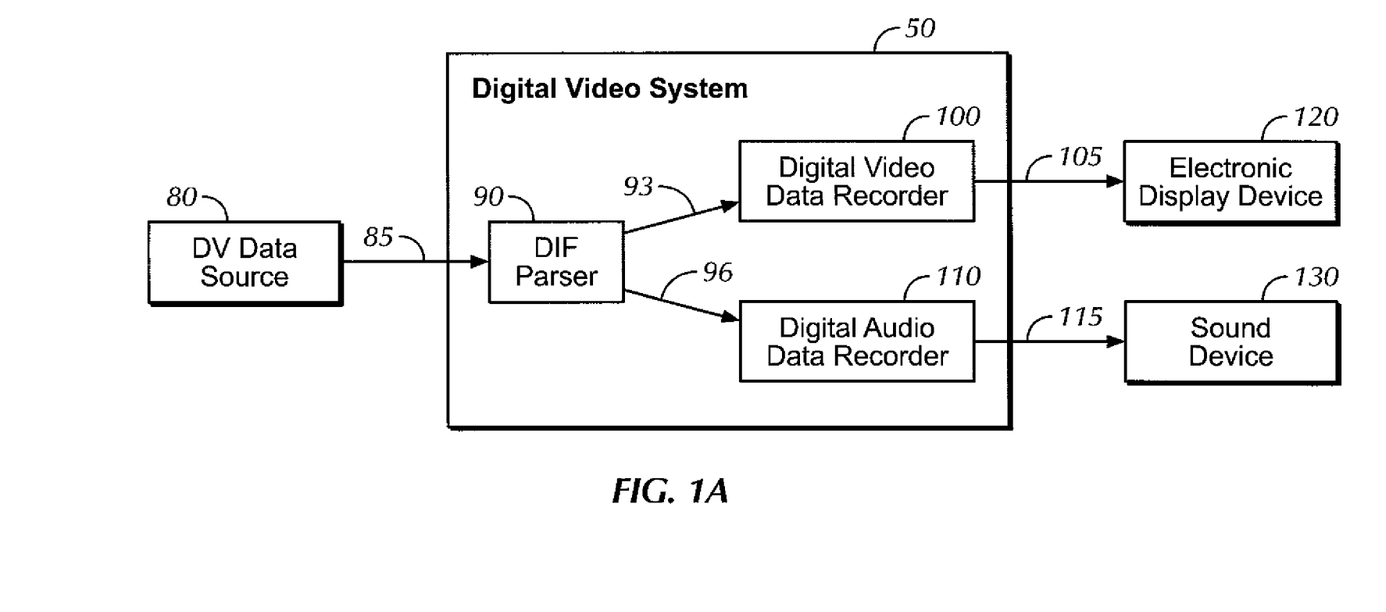
FIG. 1A illustrates a digital video system in which embodiments of the present invention can be practiced.

FIG. 1A illustrates a digital video system 50 in which embodiments of the present invention can be practiced. Although the description will focus on digital video data which is formatted as specified in a specification entitled, "The Specification of Consumer Use Digital VCR's using 6.3 mm Magnetic Tape", (HD Video Conference, December, 1994), commonly known as the DV standard, it should be understood that the present invention is applicable to digital video data which is formatted in accordance with other standards, such as standards developed by the Moving Picture Experts Group (MPEG) (e.g., MPEG-1, MPEG-2, MPEG-3, etc.).

In an embodiment, a DV data source 80 is coupled to the digital video system 50 via a data bus 85. The DV data source 80 stores the recorded DV data. The DV data source 80 can be a DV tape, a DV disk, a memory device (e.g., hard drive, RAM, ROM, etc.), or any other storage device which is capable of storing DV data. In an embodiment, the data bus 85 comprises a IEEE 1394 serial data bus 85 which is a low-cost and high-performance digital bi-directional serial bus. Alternatively, the data bus 85 can be implemented as any other type of data bus. The DV data is organized into the digital interface format (DIF) for digital transmission via the IEEE serial data bus 85.

In an embodiment, the digital video system 50 comprises a DIF parser 90 coupled to the data bus 85, a digital video data decoder 100 coupled to the DIF parser 90, and a digital audio data decoder 110 coupled to the DIF parser 90. The DIF parser 90 receives the DV data from the DV data source 80 via the data bus 85. The DIF parser 90 separates the DV data into a plurality of data streams. The data streams include a first data stream of digital video data which is formatted according to the DV standard and a second stream of digital audio data which is formatted according to the DV standard. It should be understood that the DV data can include other data, such as subcode, auxiliary video data, or auxiliary audio data. It should be understood that the DIF parser 90 can separate the DV data into other data streams, such as a data stream for subcode data (e.g., error correction data, timecode data, etc.).

In an embodiment, the digital video data decoder 100 receives the stream of digital video data, which is formatted according to the DV standard, from the DIF parser 90 via the data path 93. Similarly, the digital audio data decoder 110 receives the stream of digital audio data, which is formatted according to the DV standard, from the DIE parser 90 via the data path 96.

In an embodiment, the digital video data decoder 100 comprises a DV video decoder 100. The DV video decoder 100 decodes the digital video data into a format for displaying the recorded images on an electronic display device 120 coupled to the digital video system 50. From the DV video decoder 100, the digital video data is moved to the electronic display device 120 via a data path 105. The operation of the DV video decoder 100 will be described below. The stream of digital video data received by the DV video decoder 100 arrives in a compressed and variable length coded format compliant with the DV standard. As will be discussed below, the DV video decoder 100 decodes the variable length code format of the digital video data and decompresses the digital video data.

The digital audio decoder 110 comprises a DV audio decoder 110. The DV audio decoder 110 decodes the digital audio data into a format for rendering on a sound device 130 coupled to the digital video system 50 (e.g., a DV system). From the DV audio decoder 110, the digital audio data is moved to the sound device 130 via a data path 115. The sound device 130 can be implemented in any manner. For example, the sound device 130 can include a sound amplifier and a speaker.

It should be understood that the digital video system 50 (e.g., a DV system) of FIG. 1A can be configured in any other manner.

Figure 1B:
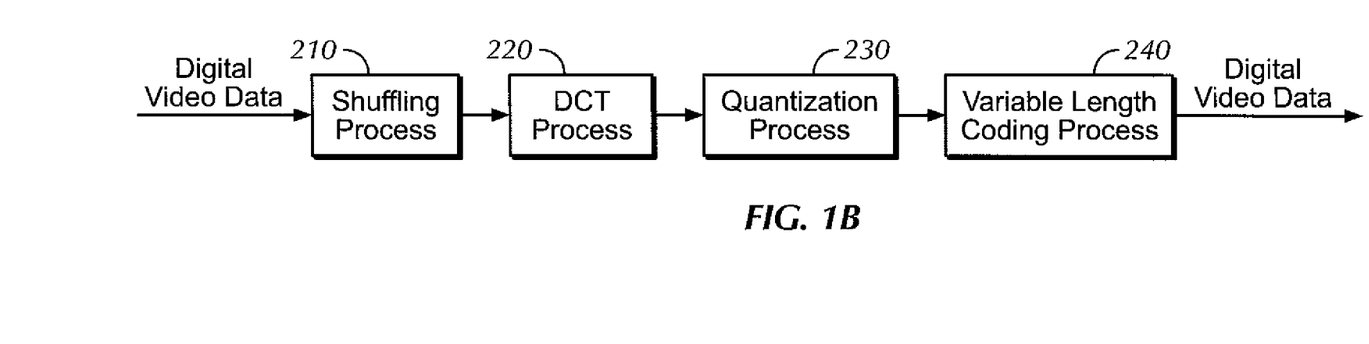
FIG. 1B illustrates encoding steps for the digital video data on which embodiments of the present invention can be practiced.

FIG. 1B illustrates encoding steps for the digital video data on which embodiments of the present invention can be practiced. Although the discussion will focus on the DV standard, it should be understood that the present invention can be practiced with digital video data which is formatted according to other standards (e.g., MPEG-1, MPEG-2, MPEG-3, etc.).

Before beginning the process of encoding digital video data into the DV format, analog video data is converted into digital video data comprising data in the Y,Cr,Cb color space, whereas Y refers to luminance data while Cr and Cb refer to chrominance data. If the analog video data is sampled according to the Phase Alternation Line (PAL) or (625/50) TV standard, the digital video data comprises data in the Y,Cr,Cb 4:2:0 color space. If the analog video data is sampled according to the National Television System Committee (NTSC) or (525/60) TV standard, the digital video data comprises data in the Y,Cr,Cb 4:1:1 color space.

In an embodiment of the encoding procedure, a stream of digital video data (e.g., data in the Y,Cr,Cb color space) first proceeds to the shuffling process 210. Here, the digital video data is divided into a plurality of macro blocks. The macro blocks are shuffled, or moved around. The shuffling step minimizes the effect of contiguous errors on the appearance of a frame of digital video data. Additionally, the shuffling step aids in error correction, makes error concealment more effective, and evens out the distribution of digital video data in a frame so that there is an even flow of digital video data through the rest of the encoding steps.

The stream of digital video data proceeds to the DCT process 220. Here, the digital video data is compressed using the Discrete Cosine Transform (DCT). In particular, digital video data is divided into a plurality of DCT blocks comprising the digital video data of 8×8 pixels and then the DCT blocks are compressed using DCT. In the 8-8-DCT mode, the digital video data of 8×8 pixels are compressed as a block. In the 2-4-8-DCT mode, the digital video data of 8×8 pixels are deinterlaced into two independent blocks comprising the digital video data of 4×8 pixels. Moreover, each block of digital video data of 4×8 pixels is compressed using DCT. The DCT process 220 generates DC coefficients and AC coefficients which are stored in each DCT block of digital video data.

The stream of digital video data proceeds to the quantization process 230. Here, the digital video data (e.g., DC coefficients and AC coefficients) compressed by the DCT process 220 is further compressed by being mapped to quantization intervals.

The stream of digital video data proceeds to the variable length coding process 240. Here, the AC coefficients of the digital video data are encoded by a variable length coding algorithm. In an embodiment, the variable length coding algorithm comprises a Huffman code format. According to the Huffman code format, a variable length coding table assigns variable length codes or symbols to AC coefficient of the digital video data, whereas the variable length symbols are shorter for more common AC coefficients and are longer for less common AC coefficients.

It should be understood that hardware or software can be used in implementing the shuffling process 210, the DCT process 220, the quantization process, and the variable length coding process 240. Moreover, the digital video data can be encoded into the DV standard using other processes.

After performing the encoding steps of FIG. 1B on the digital video data, the digital video data is stored in a DV tape, a DV disk, a memory device (e.g., hard drive, RAM, ROM, etc.), or any other storage device which is capable of storing DV data. The digital video data (which is now compressed and variable length coded) is stored in the arrangement illustrated in FIGS. 2-5.

Figure 2:
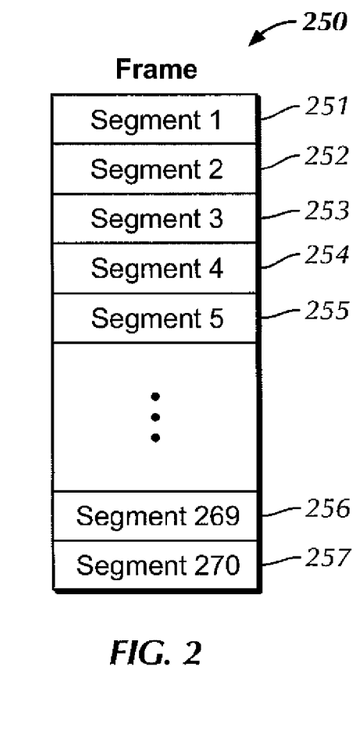
FIG. 2 illustrates a frame of digital video data on which embodiments of the present invention can be practiced.

FIG. 2 illustrates a frame 250 of digital video data (compressed and variable length coded as illustrated in FIG. 1B) on which embodiments of the present invention can be practiced. The digital video data encoded into the DV standard is divided into a plurality of frames. Each frame 250 includes a plurality of segments 251-257 of digital video data. As illustrated in FIG. 2, the frame 250 includes 270 separate segments. It should be understood that the number of segments depends on the TV standard used in sampling the analog video data as discussed above. The NTSC TV standard generally requires 270 segments per frame of digital video data.

Figure 3:
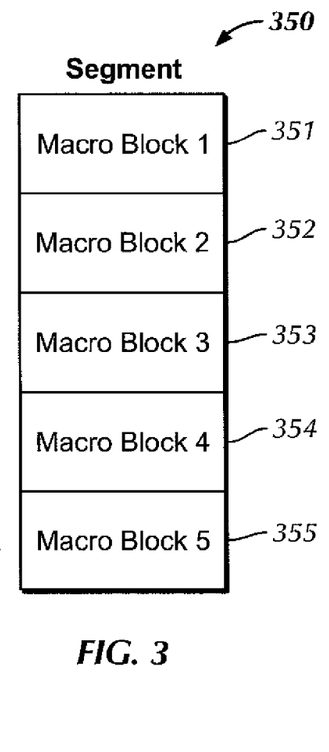
FIG. 3 illustrates a segment of digital video data on which embodiments of the present invention can be practiced.

FIG. 3 illustrates a segment 350 of digital video data (compressed and variable length coded as illustrated in FIG. 1B) on which embodiments of the present invention can be practiced. The segment 350 includes a plurality of macro blocks 351-355 of digital video data. Here, the segment 350 has five macro blocks of digital video data. It should be understood that each segment of FIG. 2 is arranged as illustrated in FIG. 3.

Figure 4:
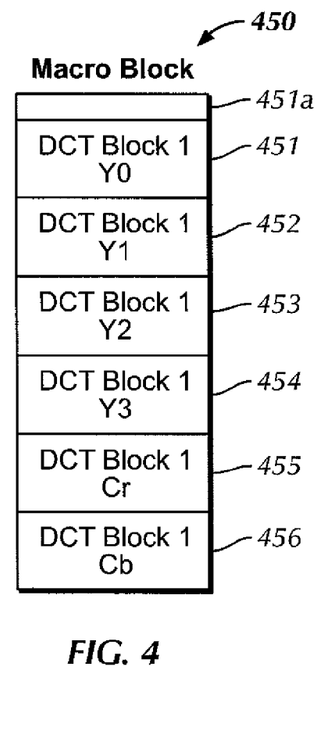
FIG. 4 illustrates a macro block of digital video data on which embodiments of the present invention can be practiced.

FIG. 4 illustrates a macro block 450 of digital video data (compressed and variable length coded as illustrated in FIG. 1B) on which embodiments of the present invention can be practiced. The macro block 450 includes a Macro Block (MB) header 451A, and a plurality of DCT blocks 451-456. In an embodiment, the MB header 451A includes four bits for STA (status of the compressed macro block) and four bits for the QNO (quantization number applied to the macro block). Here, the macro block 450 includes six DCT blocks of digital video data. DCT blocks 451-454 include digital video data corresponding to luminance data of the recorded images. DCT blocks 455-456 include digital video data corresponding to chrominance data of the recorded images. It should be understood that each macro block of FIG. 3 is arranged as illustrated in FIG. 4.

Figure 5:
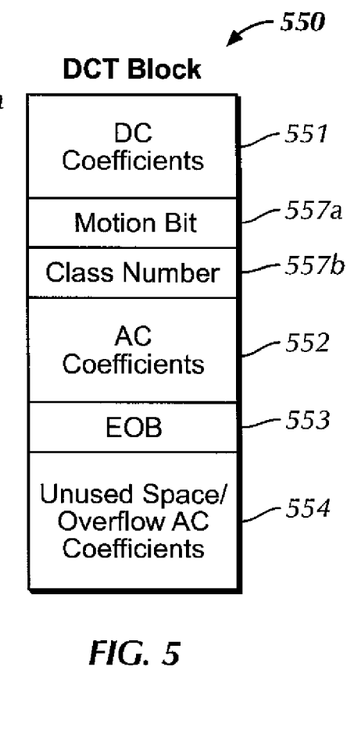
FIG. 5 illustrates a DCT block of digital video data on which embodiments of the present invention can be practiced.

FIG. 5 illustrates a DCT block 550 of digital video data (compressed and variable length coded as illustrated in FIG. 1B) on which embodiments of the present invention can be practiced. The DCT block 550 includes a plurality of digital video data. In an embodiment, the DCT block 550 includes a motion bit 557A which indicates whether to perform 8-8 IDCT or 2-4-8 IDCT, a class number 557B which is used for quantization, a plurality of DC coefficients 551 which are compressed as described in connection with FIG. 1B, a plurality of AC coefficients 552 which are compressed and variable length coded as described in connection with FIG. 1B, and an unused space/overflow AC coefficients 554. The DCT block 550 can include an end-of-block code (EOB) 553, which is variable length coded, to indicate the end of the AC coefficients corresponding to the DCT block. The DCT computation discussed in connection with FIG. 1B generates the DC coefficients and the AC coefficients for each DCT block of digital video data of 8×8 pixels. In an embodiment, the DC coefficients 551 area has a total length of nine bits, the motion bit 557A has a length of one bit, and the class number 557B has a length of two bits. It should be understood that each DCT block of FIG. 4 is arranged as illustrated in FIG. 5.

Moreover, each DCT block illustrated in FIGS. 4-5 is allocated a fixed length of bits or bytes of digital video data as required by the DV standard. The number of bits or bytes required to store the AC coefficients of the digital video data of 8×8 pixels may vary widely in accordance with the quantization process 230 described with respect to FIG. 1B. A particular DCT block may have unused space 554 within its fixed length allocation of bits or bytes while another DCT block may not have sufficient space within its fixed length allocation of bits or bytes for the AC coefficients of the digital video data of 8×8 pixels, thus generating overflow AC coefficients. The overflow AC coefficients are distributed to DCT blocks (within the same macro block) having unused space 554. The remaining overflow AC coefficients are distributed to DCT blocks (within the same segment) having unused space 554. Thus, unused space 554 in a DCT block may be used to store overflow AC coefficients belonging to other DCT blocks within the same macro block, or even within the same segment.

It should be understood that the frame 250, the segment 350, the macro block 450, and the DCT block 550 illustrated in FIGS. 2-5 can have additional types of data. Moreover, it should be understood that the digital video data can be arranged in a manner other than that described with respect to FIGS. 2-5.

Figure 6:
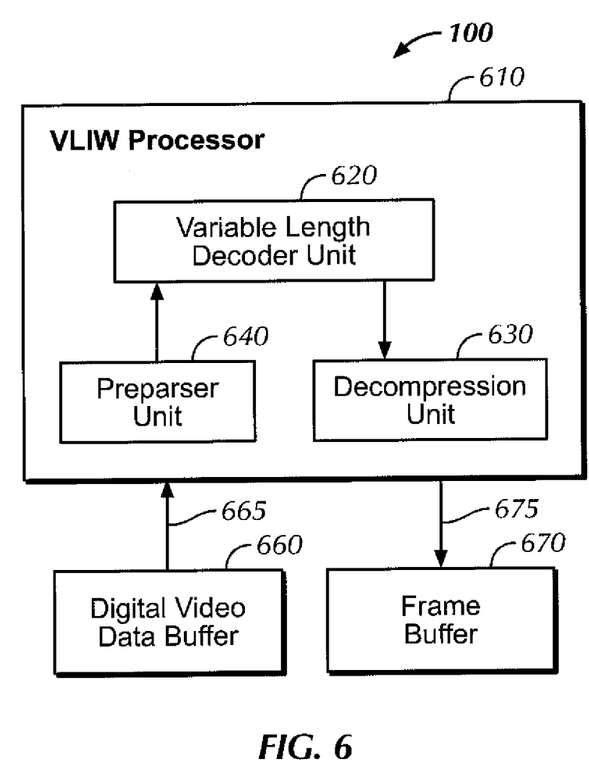
FIG. 6 illustrates a decoder, showing a VLIW processor and a variable length decoder unit in accordance with an embodiment of the present invention.

FIG. 6 illustrates a video decoder 100 of FIG. 1A, showing a VLIW processor 610 and a variable length decoder unit 620 in accordance with an embodiment of the present invention. Although the stream of digital video data decoded by the video decoder 100 is formatted according to the DV standard, it should be understood that the video decoder 100 of the present invention can decode digital video data formatted according to other standards (e.g., MPEG-1, MPEG-2, MPEG-3, etc.).

The video decoder 100 of the present invention primarily utilizes software to process the digital video data. Because the video decoder is implemented in software, the video decoder can be adapted to process different types of data formats simply by modifying the software rather than designing a new video decoder.

In an embodiment, the video decoder 100 (e.g., a DV video decoder) includes a digital video data buffer 660, a Very-Long Instruction Word (VLIW) processor 610 coupled to the digital video data buffer via a data path 665, a variable length decoder unit 620 coupled to the VLIW processor 610, and a frame buffer 670 coupled to the VLIW processor 610 via a data path 675. In an embodiment, the VLIW processor 610 and the variable length decoder unit 620 are formed on the same semiconductor device such that the VLIW processor 610 functions as the main or core processor while the variable length decoder unit 620 functions as a coprocessor. Since the digital video data is formatted according to the DV standard, the video decoder 100 will be referred to as the DV video decoder 100. The DV video decoder 100 executes on the digital video data (compressed and variable length coded) the inverse of the encoding steps discussed with respect to FIG. 1B in order to display the digital video data on an electronic display device 120 (FIG. 1A). In particular, the DV video decoder 100 decodes the variable length symbols of the digital video data, decompresses the digital video data by performing an inverse quantization process, decompresses the digital video data by performing an inverse discrete cosine transform (IDCT) process, and de-shuffles the digital video data.

In FIG. 6, some of the data paths may be logical rather than physical (e.g., a data bus). In addition, some of the data paths may share one or more data buses.

The processing of the digital video data (compressed and variable length coded as illustrated in FIG. 1B) is executed on the VLIW processor 610 and on the variable length decoder unit 620. The VLIW processor 610 preparses the digital video data to recover a decoding order of the digital video data by re-associating the overflow AC coefficients (compressed and variable length coded) of the digital video data with the corresponding DCT block, generating digital video data that is contiguous within the corresponding DCT block. In particular, a preparser unit 640 of the VLIW processor 610 preparses the digital video data. The DCT blocks are transformed from fixed length to variable length to accommodate all the digital video data belonging to each DCT block. Once the digital video data is arranged in the decoding order, the variable length coding format of the digital video data which has been preparsed can be decoded by the variable length decoder unit 620. Furthermore, the VLIW processor 610 decompresses the digital video data which has been decoded and de-shuffles the digital video data which has been decompressed. In particular, a decompression unit 630 of the VLIW processor 610 decompresses and de-shuffles the digital video data.

The DV video decoder 100 of the present invention has superior speed and performance characteristics because the VLIW processor 610 preparses the digital video data prior to the variable length decoder unit 620 decoding the digital video data. The VLIW processor 610 breaks program instructions down into basic operations that can be performed in parallel. Complexity is moved from the hardware of the VLIW processor 610 to software executed by the VLIW processor 610. The variable length decoder unit 620 can decode variable length symbols much faster than the VLIW processor 610. However, it is very difficult to use the variable length decoder unit 620 to preparse the digital video data to recover the decoding order of the digital video data so that the digital video data is contiguous within the corresponding DCT block since the variable length decoder unit 620 lacks the general functionality of a general purpose processor or the VLIW processor 610.

According to the present invention, the logically complicated process of preparsing the digital video data is executed by the VLIW processor 610, leaving the variable length decoder unit 620 responsible for decoding the variable length symbols of the digital video data which has been preparsed. Moreover, the VLIW processor 610/variable length decoder unit 620 architecture facilitates concurrent execution of multiple processes to improve performance of the DV video decoder 100. A first plurality of digital video data is preparsed by the preparser unit 640 while a second plurality of digital video data which has been preparsed is decoded by the variable length decoder unit 620. Moreover, a third plurality of digital video data which has been decoded is decompressed and de-shuffled while the second plurality of digital video data which has been preparsed is decoded by the variable length decoder unit 620.

Referring to FIG. 6, a stream of digital video data is received by the digital video data buffer 660. Digital video data is transferred to the preparser unit 640 via the data path 665. After the preparser unit 640 processes the digital video data, the digital video data proceeds to the variable length decoder unit 620. From the variable length decoder unit 620, the digital video data proceeds to the decompression unit 630. Finally, the digital video data is transferred via the data path 675 from the decompression unit 630 to the frame buffer 670 from which the digital video data can be readily displayed on an electronic display device 120 (FIG. 1A). In an embodiment, the digital video data buffer 660 and the VLIW processor 610 are formed on separate semiconductor devices. The digital video data buffer 660 can be implemented as synchronous dynamic random access memory (SDRAM) or any other type of memory. In an embodiment, the frame buffer 670 and the VLIW processor 610 are formed on separate semiconductor devices.

In an embodiment, the VLIW processor 610 comprises a model MAP1000A media accelerated processor manufactured by Equator Technologies, Inc. of Seattle, Wash. (www.equator.com). The preparser unit 640 and the decompression unit 630 are implemented on the VLIW processor 610 or core processor of the MAP1000A. The variable length decoder unit 620 is implemented on the coprocessor (which includes a variable length encoder/decoder) of the MAP1000A. It should be understood the DV video decoder 100 can be implemented with other VLIW processors or general purpose processors.

Figure 7:
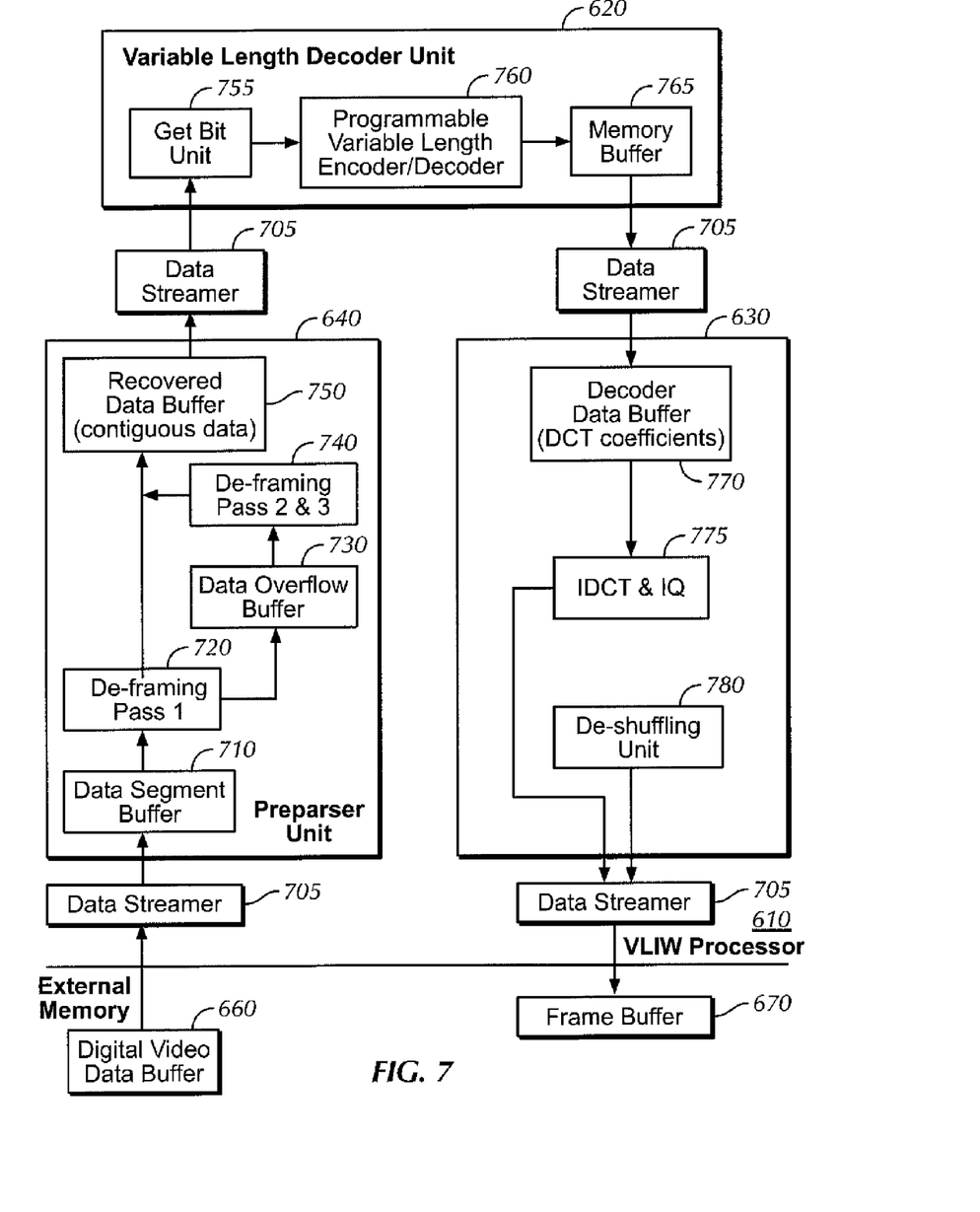
FIG. 7 illustrates operations executed on digital video data by the decoder of FIG. 6 in accordance with an embodiment of the present invention.

FIG. 7 illustrates operations executed on digital video data by the DV video decoder 100 of FIG. 6 in accordance with an embodiment of the present invention. A data streamer 705 of the VLIW processor 610 is coupled to the digital video data buffer 660 and to a data segment buffer 710. In an embodiment, the data streamer 705 comprises a programmable direct memory access (DMA) unit. The data streamer 705 moves the digital video data to the preparser unit 640. In particular, the data streamer 705 moves the digital video data to the data segment buffer 710. In an embodiment, the data streamer 705 moves a segment of digital video data or five macro blocks of digital video data or 30 DCT blocks of digital video data to the data segment buffer 710. It should be understood that the amount of digital video data transferred to the data segment buffer 710 depends on the size of the data segment buffer 710. In an embodiment, the data segment buffer 710 comprises static random access memory (SRAM).

The data segment buffer 710 is coupled to a de-framing pass 1 unit 720 of the VLIW processor 610. The de-framing pass 1 unit 720 of the VLIW processor 610 executes software instructions which determine those DCT blocks in which all the AC coefficients (compressed and variable length coded) are stored within the corresponding DCT blocks. An EOB 553 (FIG. 5), which is variable length coded, found before the end of the fixed length of the DCT block indicates that the DCT block stores all of its DC coefficients (compressed) and AC coefficients (compressed and variable length coded). In an embodiment, 30 DCT blocks of digital video data are processed in parallel by the de-framing pass 1 unit 720 of the VLIW processor 610. It should be understood that the number of DCT blocks which can be processed in parallel depends on the processing speed of the preparser unit 640 and the resources allocated by the VLIW processor 610. The de-framing pass 1 unit 720 of the VLIW processor 610 is coupled to a recovered buffer 750 and a data overflow buffer 730.

The DCT blocks of digital video data having overflow AC coefficients (compressed and variable length coded) are moved from the de-framing pass 1 unit 720 to the data overflow buffer 730 while the rest of the DCT blocks are moved from the de-framing pass 1 unit 720 to the recovered buffer 750. The data overflow buffer 730 is coupled to a de-framing pass 2 & 3 unit 740 of the VLIW processor 610. From the data overflow buffer 730, the DCT blocks of digital video data having overflow AC coefficients (compressed and variable length coded) are moved to a de-framing pass 2 & 3 unit 740 of the VLIW processor 610. The de-framing pass 2 & 3 unit 740 of the VLIW processor 610 executes software instructions which re-associate the overflow AC coefficients (compressed and variable length coded) belonging to DCT blocks within the same macro block. Moreover, the de-framing pass 2 & 3 unit 740 of the VLIW processor 610 executes software instructions which re-associate the overflow AC coefficients (compressed and variable length coded) belonging to DCT blocks within the same segment. The de-framing pass 2 & 3 unit 740 of the VLIW processor 610 is coupled to the recovered data buffer 750. From the de-framing pass 2 & 3 unit 740 of the VLIW processor 610, the DCT blocks are moved to the recovered data buffer 750.

After processing by the de-framing pass 1 unit 720 of the VLIW processor 610 and the de-framing pass 2 & 3 unit 740 of the VLIW processor 610, the preparser unit 640 has recovered a decoding order of the digital video data so that the variable length decoder unit 620 can decode the digital video data. The recovered data buffer 750 stores digital video data that is contiguous within the corresponding DCT block. The overflow AC coefficients (compressed and variable length coded) are now associated with the corresponding DCT block. The DCT blocks have variable lengths to accommodate all the overflow AC coefficients (compressed and variable length coded) belonging to the corresponding DCT block. Additionally, each DCT block includes an EOB symbol to indicate the end of the DC coefficients (compressed) and the AC coefficients (compressed and variable length coded) of the DCT block. If there is no EOB symbol within a DCT block in the input stream of digital video data received from the digital video data buffer 660, the de-framing pass 2 & 3 unit 740 inserts an EOB symbol within the end of that DCT block. Therefore, the variable length decoding unit 620 can determine the end of each DCT block by looking for the EOB symbol. Moreover, the variable length decoder unit 620 can now proceed to decode the variable length code format of the DCT blocks of digital video data. As discussed above, it is very difficult to utilize the variable length decoder unit 620 to preparse the digital video data. In an embodiment, the variable length code format comprises a Huffman code format.

The data streamer 705 transfers the digital video data from the recovered data buffer 750 to a get bit unit 755 of the variable length decoder unit 620. The get bit unit 755 is coupled to a programmable variable length encoder/decoder 760. The programmable variable length encoder/decoder 760 is coupled to a memory buffer 765.

In an embodiment, the get bit unit 755 comprises hardware that facilitates movement of digital video data from the data streamer 705 to the programmable variable length encoder/decoder 760. In an embodiment, the programmable variable length encoder/decoder 760 executes firmware instructions which decode the variable length symbols of the AC coefficients of the digital video data. The variable length symbols are Huffman code symbols. In an embodiment, the variable length decoder unit 620 decodes the variable length code format of a DCT block of digital video data at a time. Moreover, the programmable variable length encoder/decoder 760 controls how the digital video data is transferred by the data streamer 705 and by the get bit unit 755 during the variable length decoding process. The memory buffer 765 stores DCT blocks of digital video data that have been decoded by the programmable variable length encoder/decoder 760.

The data streamer 705 transfers the digital video data from the memory buffer 765 to a decoded data buffer 770 of a decompression unit 630 of the VLIW processor 610. The decoded data buffer 770 is coupled to a IDCT & IQ unit 775 of the VLIW processor 610. The IDCT & IQ unit 775 of the VLIW processor is coupled to the data streamer 705. A de-shuffling unit 780 is coupled to the data streamer 705.

The preparser unit 640 and the decompression unit 630 can be executed on the same VLIW processor 610. In an embodiment, the preparser unit 640 and the decompression unit 630 may run or execute according to time share criteria. For example, the preparser unit 640 and the decompression unit 630 can run on the VLIW processor 610 according to a fixed schedule. For instance, the VLIW processor 610 executes instructions in the preparser unit 630 for a first fixed amount of time and then switches to executing instructions in the decompression unit 640 for a second fixed amount of time. In an alternate embodiment, the decompression unit 630 and the preparser unit 630 can be controlled by an interrupt procedure. For example, when there is a DCT block in the decoded data buffer 770, an interrupt is activated and causes the VLIW processor 610 to stop executing instructions in the preparser unit 630 and to start executing instructions in the decompression unit 630 for a particular amount of time.

In an embodiment, the decoded data buffer 770 stores a macro block (or six DCT blocks) of digital video data that has been decoded by the variable length decoder unit 620. In particular, the decoded data buffer 770 stores the DC coefficients (compressed) and the AC coefficients (compressed) necessary for the inverse discrete cosine transform (IDCT). In an embodiment, the IDCT & IQ unit 775 of the VLIW processor 610 executes software instructions which decompress the digital video data by performing the inverse quantization (IQ) on a macro block of digital video data at a time. Moreover, the IDCT & IQ unit 775 of the VLIW processor 610 executes software instructions which decompress the digital video data by performing the inverse discrete cosine transform (IDCT) on a macro block of digital video data at a time. The de-shuffling unit 780 can determine the correct macro block position for each macro block on the frame of digital video data by using a macro block index.

The data streamer 705 transfers the digital video data from the IDCT & IQ unit 775 of the VLIW processor 610 to the frame buffer 670 from which a frame of the digital video data can be readily displayed on an electronic display device 120 (FIG. 1A). The data streamer 705 is controlled by the de-shuffling unit 780 to ensure the macro blocks are transferred to the correct macro block position on the frame of the digital video data, which is analogous to putting together a jigsaw puzzle. It should be understood that MPEG formatted data does not require de-shuffling.

Figure 8:
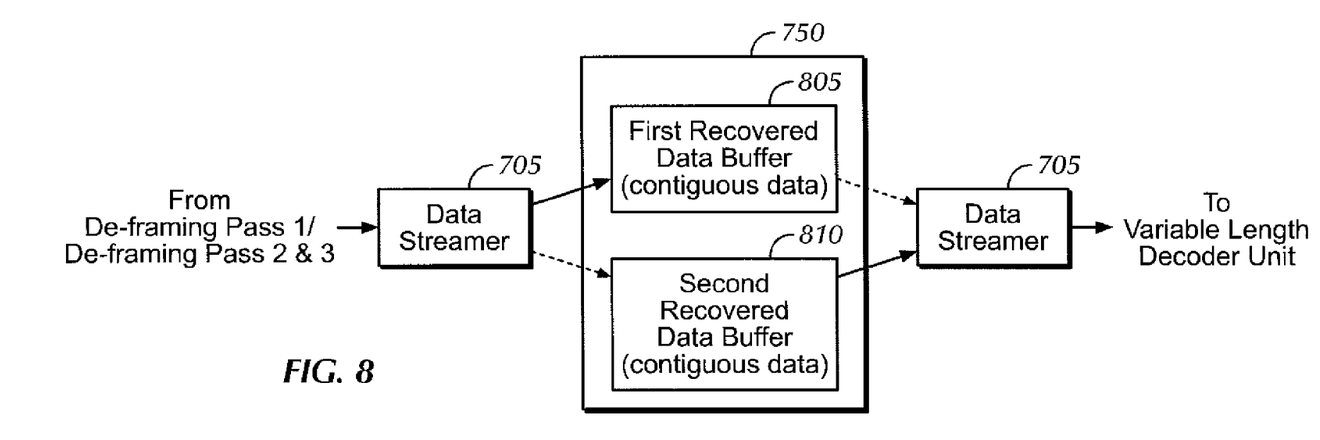
FIG. 8 illustrates a recovered data buffer in accordance with an embodiment of the present invention.

FIG. 8 illustrates a recovered data buffer 750 of FIG. 7 in accordance with an embodiment of the present invention. As illustrated in FIG. 8, the recovered data buffer 750 includes a first recovered data buffer 805 and a second recovered data buffer 810. In an embodiment, the first recovered data buffer 805 and the second recovered data buffer 810 are each configured to store a segment of digital video data. This implementation facilitates concurrent execution of preparsing of the digital video data by the preparser unit 640 and decoding of the digital video data by the variable length decoder unit 620. It should be understood that the recovered data buffer 750 can include more than two recovered data buffers. The number of recovered data buffers depends on the performance of the data streamer and available memory resources.

For example, the preparser unit 640 preparses a first segment of digital video data. The first segment of digital video data which has been preparsed is stored in the second recovered data buffer 810. While the preparser unit 640 preparses a second segment of digital video data and fills the first recovered data buffer 805 with the second segment of digital video data, the variable length decoder unit 620 decodes the first segment of digital video data which has been preparsed by emptying the second recovered data buffer 810.

Figure 9:
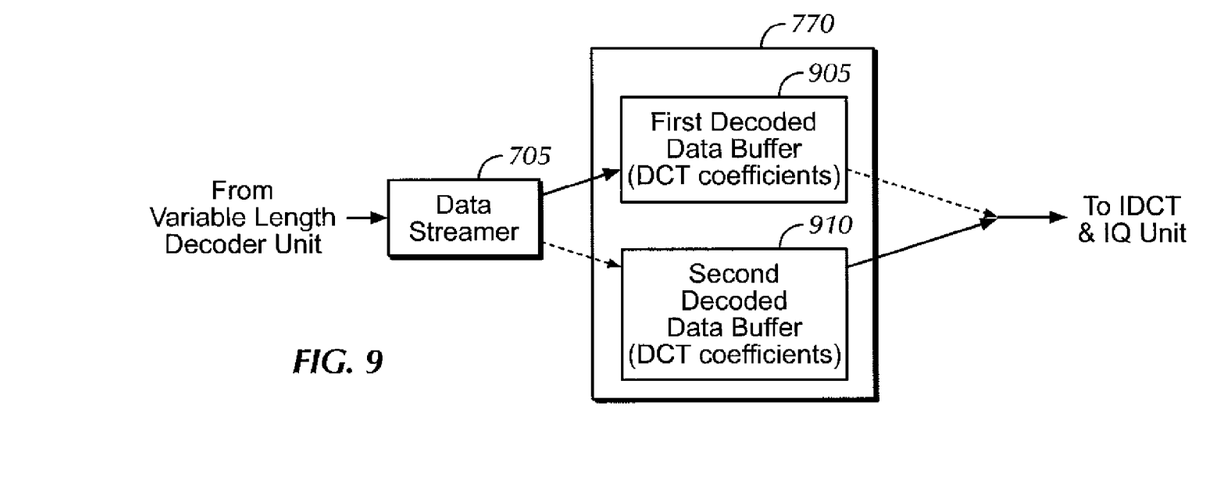
FIG. 9 illustrates a decoded data buffer in accordance with an embodiment of the present invention.

FIG. 9 illustrates a decoded data buffer 770 of FIG. 7 in accordance with an embodiment of the present invention. As illustrated in FIG. 9, the decoded data buffer 770 includes a first decoded data buffer 905 and a second decoded data buffer 910. In an embodiment, the first decoded data buffer 905 and the second decoded data buffer 910 are each configured to store a macro block of digital video data. This implementation facilitates concurrent execution of decoding of the digital video data by the variable length decoder unit 620 and decompressing of the digital video data by the decompression unit 630. It should be understood that the decoded data buffer 770 can include more than two decoded data buffers. The number of decoded data buffers depends on the performance of the data streamer and available memory resources.

For example, the variable length decoder unit 620 decodes a first macro block of digital video data, by decoding a DCT block at a time. The first macro block of digital video data which has been decoded is stored in the second decoded data buffer 910, whereas the data streamer 705 transfers the first macro block of digital video data to the second decoded data buffer 910. While the decompression unit 630 decompresses the first macro block of digital video data, which has been decoded, by emptying the second decoded data buffer 910, the variable length decoder unit 620 decodes a second macro block of digital video data (by decoding a DCT block at a time) and the data streamer 705 fills the first decoded data buffer 905. Moreover, the decompression unit 630 de-shuffles the first macro block.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing digital video data for displaying, said method comprising:
   a) preparing said digital video data to recover a decoding order of said digital video data at least in part by associating coefficients representing the digital video data with discrete cosine transform (DCT) data corresponding to the respective coefficients to render prepared digital video data, wherein the digital video data is associated with a first fixed length DCT block and at least a first portion of the digital video data cannot fit within a capacity of the first DCT block and so the first portion is associated with a second DCT block, the preparing including combining the first portion with the first fixed length DCT block to render a variable length DCT block including all of the digital video data;
   b) decoding a variable length coding format of said prepared digital video data to render decoded digital video data; and
   d) decompressing said decoded digital video data to facilitate display thereof on an electronic display device.

2. A method as recited in claim 1 further comprising: accessing a first plurality of said digital video data that has been processed by a); and performing a) on a second plurality of said digital video data while b) is performed on said first plurality of said digital video data.

3. A method as recited in claim 1 further comprising: accessing a first portion of said digital video data that has been processed by b); and
   performing b) on a second portion of said digital video data while d) is performed on said first portion of said digital video data.

4. A method as recited in claim 1 wherein a) and d) are performed by a very long instruction word (VLIW) processor.

5. A method as recited in claim 4 wherein b) is performed by a variable length decoding unit, and wherein a) and d) are performed according to time sharing criteria such that decompressing is halted while performing the preparing and such that the preparing is halted while decompressed.

6. A method as recited in claim 1 further comprising de-shuffling said digital video data to form a frame of said digital video data.

7. A method as recited in claim 1 wherein said variable length coding format comprises a Huffman code format.

8. A method as recited in claim 1 wherein said digital video data comprises DV formatted data.

9. A method as recited in claim 1 wherein said digital video data comprises MPEG formatted data.

10. A computer-readable medium that is not a carrier wave and that stores computer-executable instructions for performing a method of processing digital video data for displaying, said method comprising:
    a) processing the digital video data to recover a decoding order of said digital video data at least in part by changing data blocks associated with the video data from fixed length to variable length, wherein the digital video data is associated with a first fixed length DCT block and at least a first portion of the digital video data cannot fit within a capacity of the first DCT block and so the first portion is associated with a second DCT block, the processing including combining the first portion with the first fixed length DCT block to render a variable length DCT block including all of the digital video data;
    b) decoding a variable length coding format of said digital video data; and
    d) decompressing said digital video data to facilitate displaying said digital video data on an electronic display device.

11. A computer-readable medium as recited in claim 10, wherein the instructions further comprise:
    accessing a first plurality of said digital video data that has been processed by a) and performing a) on a second plurality of said digital video data while b) is performed on said first plurality of said digital video data.

12. A computer-readable medium as recited in claim 10, wherein the instructions further comprise:
    accessing a first portion of said digital video data that has been processed by b); and performing b) on a second portion of said digital video data while d) is performed on said first portion of said digital video data.

13. A computer-readable medium as recited in claim 10, wherein a) and d) are performed by a very long instruction word (VLIW) processor.

14. A computer-readable medium as recited in claim 13, wherein b) is performed by a variable length decoding unit, and wherein a) and d) are performed according to time sharing criteria such that decompressing is halted while performing the preparing and such that the preparing is halted while decompressing.

15. A computer-readable medium as recited in claim 13, wherein the instructions further comprise de-shuffling said digital video data to form a frame of said digital video data.

16. A computer-readable medium as recited in claim 13, wherein said variable length coding format comprises a Huffman code format.

17. A computer-readable medium as recited in claim 10 wherein the data blocks associated with the video data that are changed from fixed length to variable length are discrete cosine transform (DCT) blocks.

18. An apparatus for processing digital video data for displaying, said apparatus comprising:
    a processor configured to process said digital video data to recover a decoding order of said digital video data at least in part by recovering at least one coefficient associated with a first digital video data element from at least one discrete cosine transform (DCT) block associated with at least a second digital video data element, wherein the digital video data is associated with a first fixed length DCT block and at least a first portion of the digital video data cannot fit within a capacity of the first DCT block and so the first portion is associated with a second DCT block, the preparing including combining the first portion with the first fixed length DCT block to render a variable length DCT block including all of the digital video data; and a decoding unit coupled to said processor, wherein said decoding unit is configured to decode a coding format of said digital video data.

19. An apparatus as recited in claim 18 wherein said decoding unit accesses a first plurality of said digital video data that has been processed by said processor, and wherein said processor processes a second plurality of said digital video data while said decoding unit decodes said first plurality of said digital video data.

20. An apparatus as recited in claim 18 wherein said processor is further configured to decompress said digital video data to facilitate displaying said digital video data on an electronic display device after said decoding unit decodes said digital video data.

* * * * *